US007007841B2

(12) United States Patent
Kocott

(10) Patent No.: US 7,007,841 B2
(45) Date of Patent: Mar. 7, 2006

(54) SYSTEMS AND METHODS FOR TRACKING TOBACCO PACKAGES

(76) Inventor: Joseph M. Kocott, 2344 School St., Pittsburgh, PA (US) 15235

( * ) Notice: Subject to any disclaimer, the term of this patent is extended or adjusted under 35 U.S.C. 154(b) by 0 days.

(21) Appl. No.: 10/966,339

(22) Filed: Oct. 14, 2004

(65) Prior Publication Data

US 2005/0109839 A1 May 26, 2005

Related U.S. Application Data

(60) Provisional application No. 60/511,069, filed on Oct. 14, 2003.

(51) Int. Cl.
*G06F 17/00* (2006.01)
*G06F 17/60* (2006.01)
(52) U.S. Cl. ..................... 235/385; 235/375
(58) Field of Classification Search ............... 235/375, 235/385, 462.01; 705/28
See application file for complete search history.

(56) References Cited

U.S. PATENT DOCUMENTS

| 6,282,516 | B1 * | 8/2001 | Giuliani ................ 705/14 |
| 6,595,422 | B1 * | 7/2003 | Doljack ................ 235/462.42 |
| 6,810,816 | B1 * | 11/2004 | Rennard ................ 102/430 |
| 6,851,615 | B1 * | 2/2005 | Jones ................ 235/487 |
| 2002/0178959 | A1 * | 12/2002 | Rennard ................ 102/430 |
| 2003/0069793 | A1 * | 4/2003 | Rudolph et al. ............ 705/19 |
| 2004/0200492 | A1 * | 10/2004 | Brooks ................ 131/364 |

\* cited by examiner

*Primary Examiner*—Thien M. Le
*Assistant Examiner*—April Taylor
(74) *Attorney, Agent, or Firm*—Blynn L. Shideler; Krisanne Shideler; BLK Law Group

(57) ABSTRACT

Systems and methods for systematically tracking tobacco packages throughout a given area (e.g., country, state, county, or municipality) to ascertain the transferee or purchaser of a tobacco package at any given time in the history of the transfer or purchase of the tobacco package.

18 Claims, 6 Drawing Sheets

SYSTEMS AND METHODS FOR TRACKING TOBACCO PACKAGES

This application claims priority to U.S. Provisional Application No. 60/511069, which was filed on Oct. 14, 2003 and is incorporated by reference in its entirety.

TECHNICAL FIELD

The present invention relates generally to systems and methods for tracking packages. More particularly, the present invention relates to systems and methods for tracking tobacco packages from the point of manufacture, through distribution, to a point of detection to enable verification of the purchaser or transferee of a specific tobacco package.

BACKGROUND

Tracking systems traditionally have been used to provide benefits to sellers as well as consumers. For instance, one example of a tracking system described in U.S. Pat. No. 6,409,082 to Davis et al. prevents products from being sold by unauthorized distributors. Another example of a tracking system described in U.S. Pat. No. 5,478,990 to Montanari et al. allows consumers to verify the organic status of a food product and/or to identify the source of contamination.

In the tobacco industry and society in general, however, there is a lack of any satisfactory method for tracking tobacco packages. Once a tobacco package is purchased, the purchaser can, without much apprehension, give or sell the tobacco product to underage persons. Additionally, if underage persons are found to have been using tobacco products, there usually is no way to conclusively determine the purchaser of the tobacco package. The underage persons are usually reluctant to divulge the name of the person who gave or sold them the tobacco package, and if they do divulge a name, that person usually denies the same, putting the law enforcement personnel in the position to determine who is telling the truth.

Regardless of the type or types of tobacco product used, tobacco use has detrimental effects on physical and mental health. Not a single organ or organ system in the body is unaffected by exposure to smoke, particularly chronic exposure. Smoking or chewing tobacco is directly related to thousands upon thousands of deaths each year from cancer of the mouth, throat and lungs, emphysema, chronic bronchitis, and heart disease, to name a few.

Unfortunately, smoking as a way of life has continued among certain parts of the population and is still portrayed by Hollywood as a sign of being rebellious. Young people often begin to smoke to draw from this image, using a cigarette as a calling card for their particular clique. Regardless of the plethora of information available to young people today with respect to its health consequences, tobacco use is often looked upon as a right of passage from adolescence to adulthood; it is a gesture that accompanies the movement from your family of origin to independence.

Although laws have been implemented to restrict the sale of tobacco to those below eighteen years of age, tobacco products are still easily obtainable by young persons. Accordingly, there is a need for systems and methods for tracking tobacco packages in a way that attempts to inhibit the use of tobacco products by minors and acts as a deterrent to underage tobacco use.

SUMMARY

In general, tobacco packages are tracked from the point of manufacture, through distribution, to a point of detection. Because the system is capable of identifying and verifying the purchaser and/or transferee of the tobacco package, accountability is created for each purchaser and/or transferee of the tobacco package so that the purchaser or transferee will be less inclined to give or sell the tobacco product to underage persons.

In one embodiment, individual tobacco packages are permanently affixed with a unique identity code. Whenever and wherever tobacco products are transferred, each individual tobacco package will be scanned by a scanning system and associated with identification information for the transferee or purchaser. The identification information will also be scanned by a scanning system. At each point of transfer or purchase, the associated information is transmitted via a network to a centralized host system, where it is stored. This stored series of associated information comprises a tobacco package tracking data record.

In some implementations, when a tobacco package is scanned at a point of detection, authorized personnel can then access the tobacco package tracking data record. The tobacco package tracking data record will indicate the transferee or purchaser of the tobacco package at each point of transfer or purchase, as well as the place, date and time of the transfer or purchase. This information will be relative to each identity code. This enables one to ascertain the transferee or purchaser of a tobacco package at any interval through its progression from manufacture to detection.

DETAILED DESCRIPTION

In one general aspect, the present invention provides a method of identification that allows a random tobacco package's identity to be ascertained. The present invention thus makes it possible to track an individual tobacco package, thereby creating the ability to determine responsibility for each package.

Figure 1:
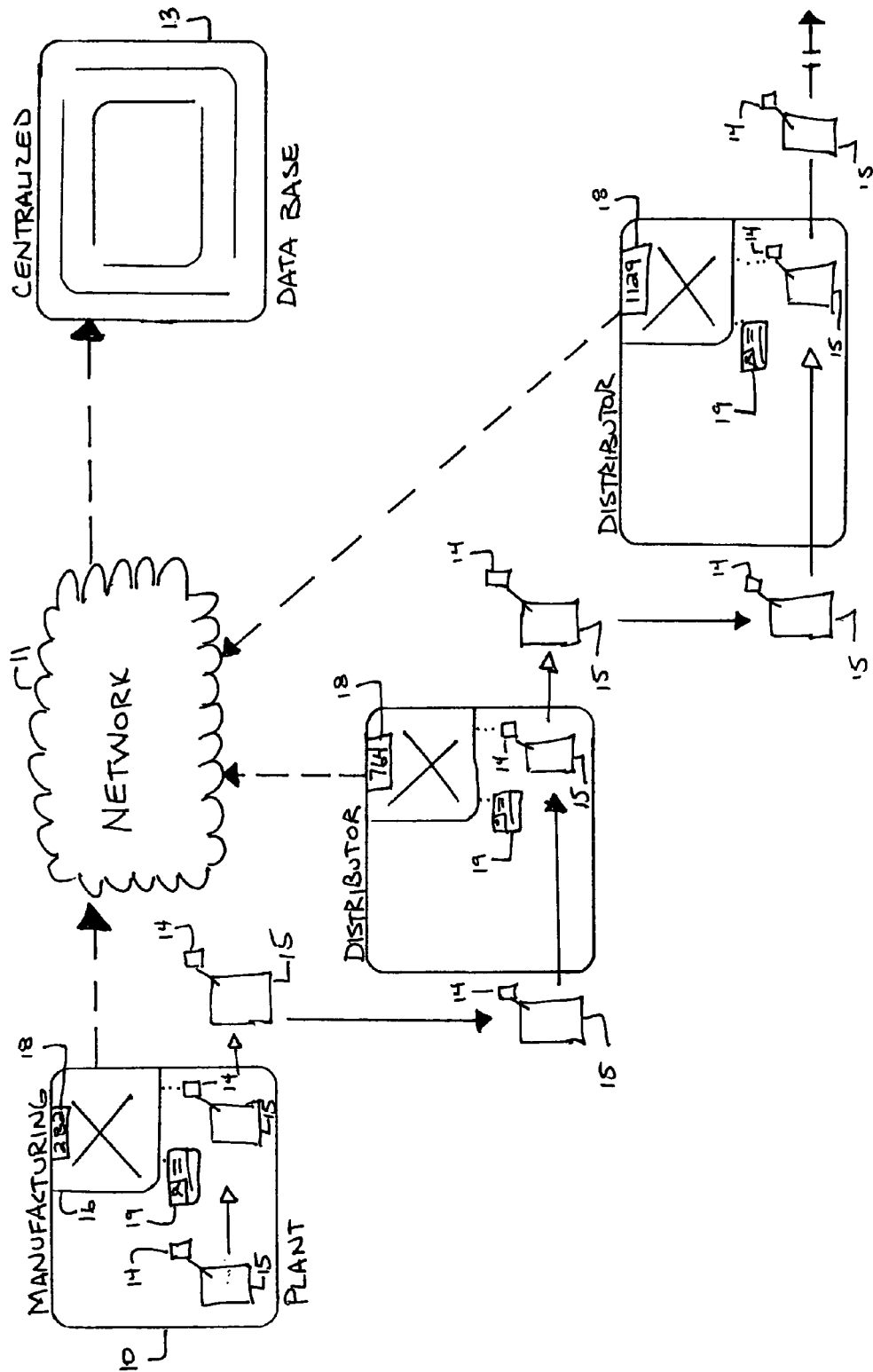
FIG. 1 illustrates a block diagram of one embodiment of a tracking system.

FIG. 1 illustrates one embodiment of a tracking system. It is to be understood that some elements of the tracking system may include numerous interconnected computers and components designed to perform a set of specified operations.

In this embodiment, the tracking system is configured to track the progression of a tobacco package 15 from a point of manufacture 10 to a point of storage. A tobacco package may be any item that includes a tobacco product, such as, for example, a pack of cigarettes, a carton of cigarettes, a container of chewing tobacco, etc.

In one implementation, identity of each tobacco package 15 is determined by means of an identity code 14. For example, each individual tobacco package 15 may have a unique identity code 14 that is permanently affixed to the tobacco package 15 at a point of manufacture 10, for example. The identity code 14 may contain a series of identifying numbers, letters, symbols, and/or combination thereof. In some embodiments, the identity code 14 may be implemented by a bar code or a radio frequency identifier (RFID), such as, for example, a radio frequency tag.

In one implementation, the identity code 14 is capable of being deciphered by an identity code reader 16 located at every point of transfer or sale 17. Each identity code reader 16, in turn, may be given a reference number 18 corresponding to a unique number that identifies the particular distributor or retail outlet, i.e. a point of transfer or sale 17.

At each point or stage, information affixed on each package 15 is associated with identification information from the purchaser or transferee of the package. This associated information is then transmitted via a network 11 and stored in a centralized database 13.

Figure 2:
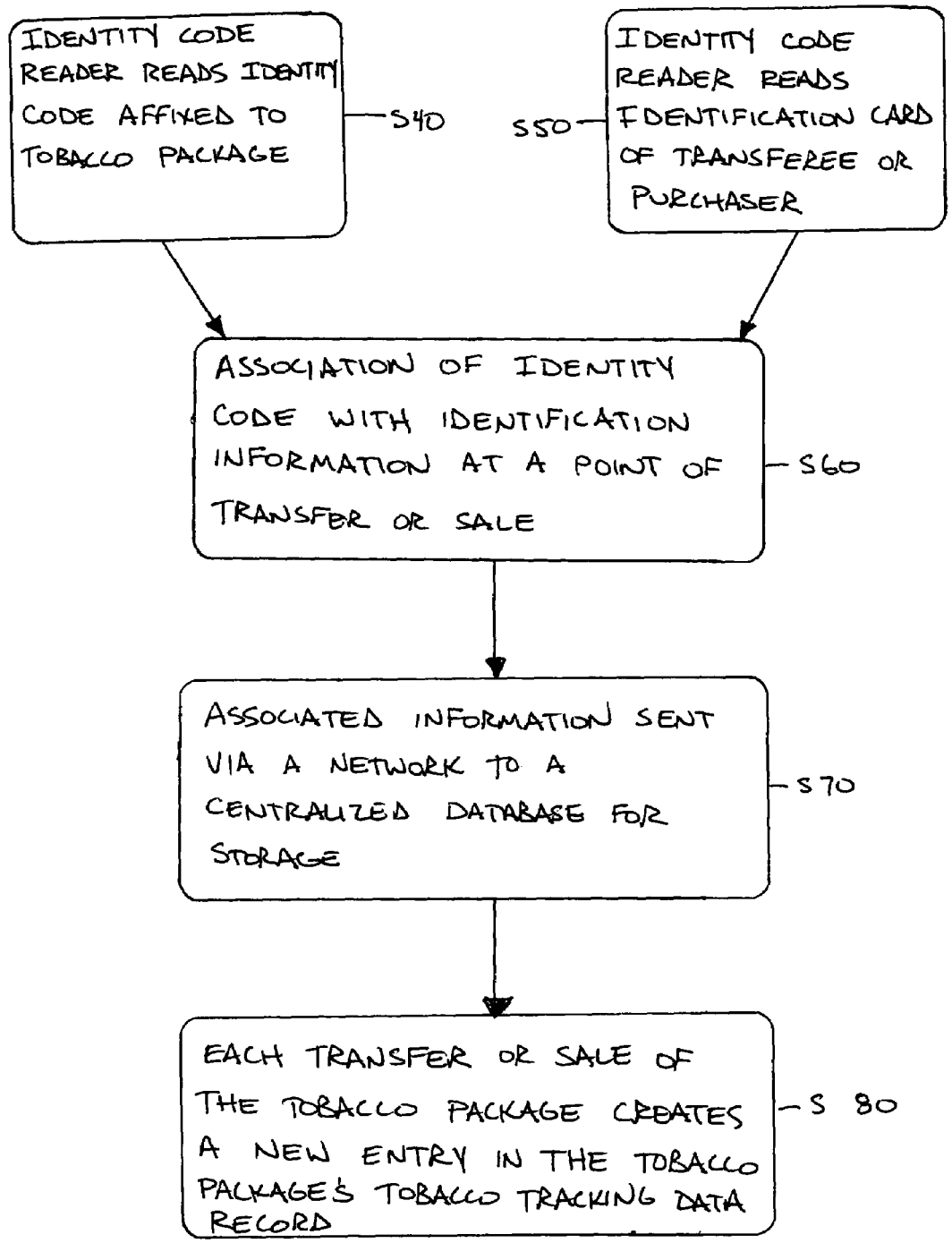
FIG. 2 is a flow chart illustrating one embodiment of a method for associating a tobacco package with a transferee and/or purchaser.

FIG. 2 is a flow chart illustrating a series of steps that may be performed at a point of transfer or sale for associating the tobacco package with the transferee or purchaser. It is to be understood that aspects of this method, in some cases, may be implemented by hardware (e.g., device, computer, computer system, equipment, component), software (e.g., program, application, instructions, code), a storage medium (e.g., disk, external memory, internal memory, propagated signal), or combination thereof.

Before a tobacco package 15 is transferred from each point 10, 17, the identity code reader 16 reads each identity code affixed 14 to each tobacco package (S40). Additionally, the identity code reader 16 reads an identification card 19 produced by the transferee or purchaser of the tobacco package 15 (S50). Selected information from the identification card is associated and correlated with the identity code 14 at the point of transfer or sale 17 (S60). The selected identification information from the identification card may include the purchaser's birth date, address and/or license number. In one embodiment, at least one of the identity code 14 and the identification information may be implemented by a radio frequency identifier (RFID), such as, for example, a radio frequency tag.

The associated information, the reference number and the date and time of the sale 81, is then transmitted 12 via a network 11 to a centralized database 13 for storage (S70). Ostensibly, each transfer or sale of the tobacco package 15 will create a new compilation of information, i.e. the associated information coupled the reference number and date and time of the transaction (S80). Thus each sale or transfer will create a new entry in the storage database 82, with the new entry being categorized with the other transfers respective to the identity code.

Figure 3:
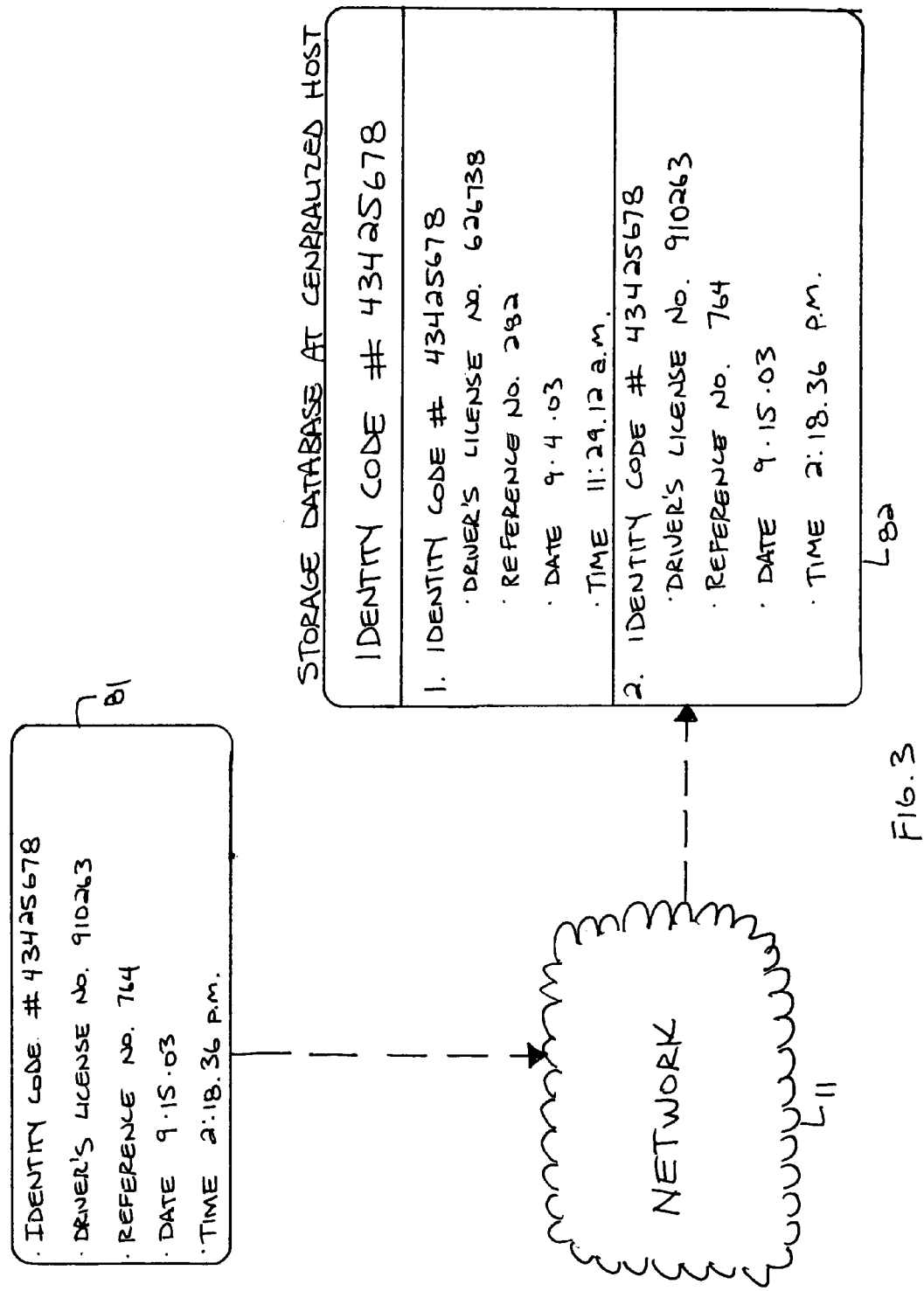
FIG. 3 illustrates one embodiment of an entry into a tobacco package tracking data record.

FIG. 3 illustrates an example of an entry 81 to the storage database 82. As described above, whenever and wherever a tobacco package is transferred, either from manufacturer to distributor, distributor to distributor, distributor to retail outlet, distributor to purchaser, or retail outlet to a purchaser, each tobacco package will be scanned by a scanning system and associated with identification information for the transferee or purchaser. The identification will also be scanned by the scanning system. At each point of transfer or purchase, the associated information is transmitted via a network to a centralized host system, where it is stored.

Figure 4:
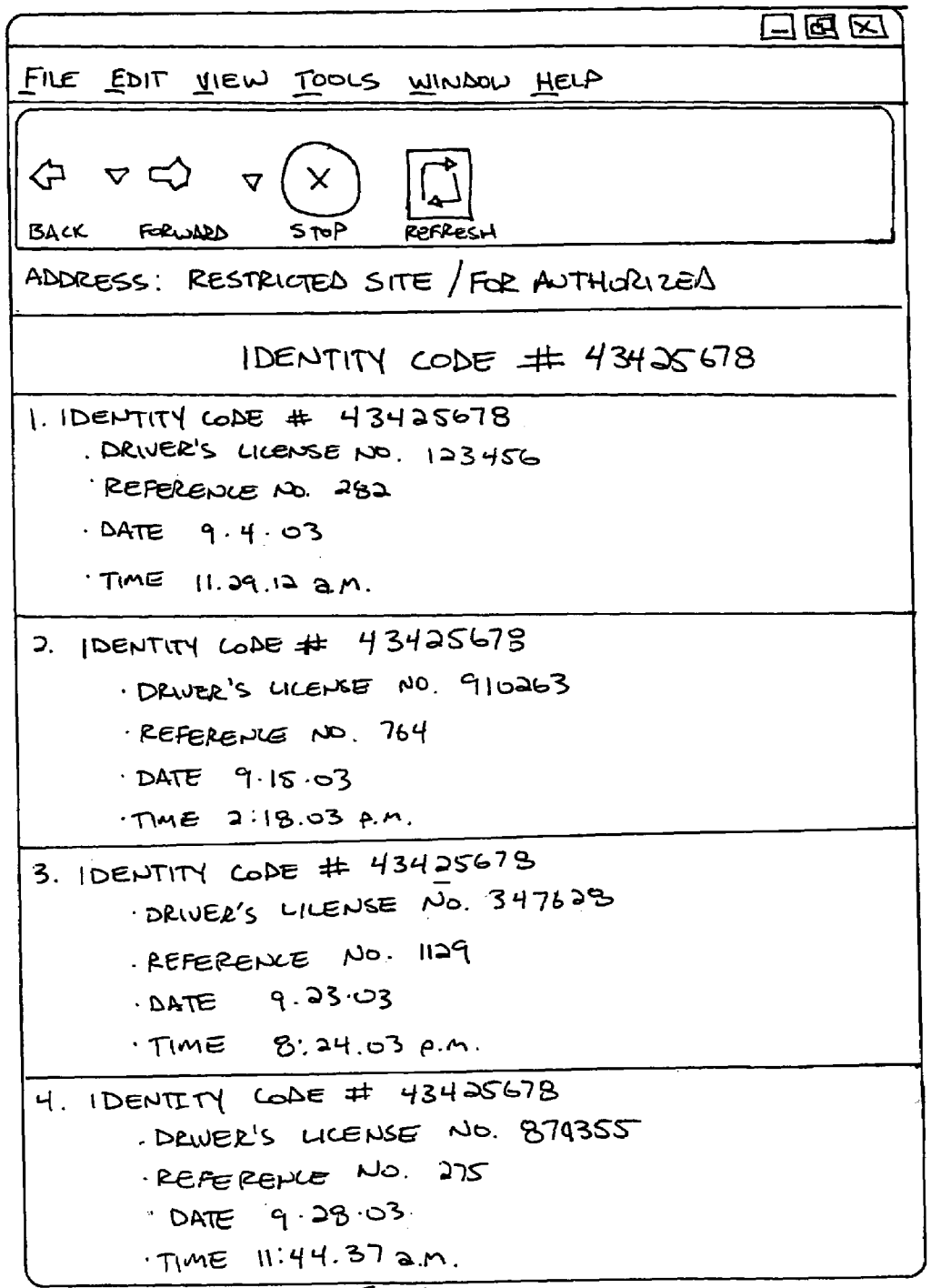
FIG. 4 illustrates one embodiment of a tobacco package tracking data record.

This series of associated information comprises a tobacco package tracking data record. The associated identification information gathered by the identity code reader can be represented as a tobacco package tracking data record, such as that represented graphically in FIG. 4.

Figure 5:
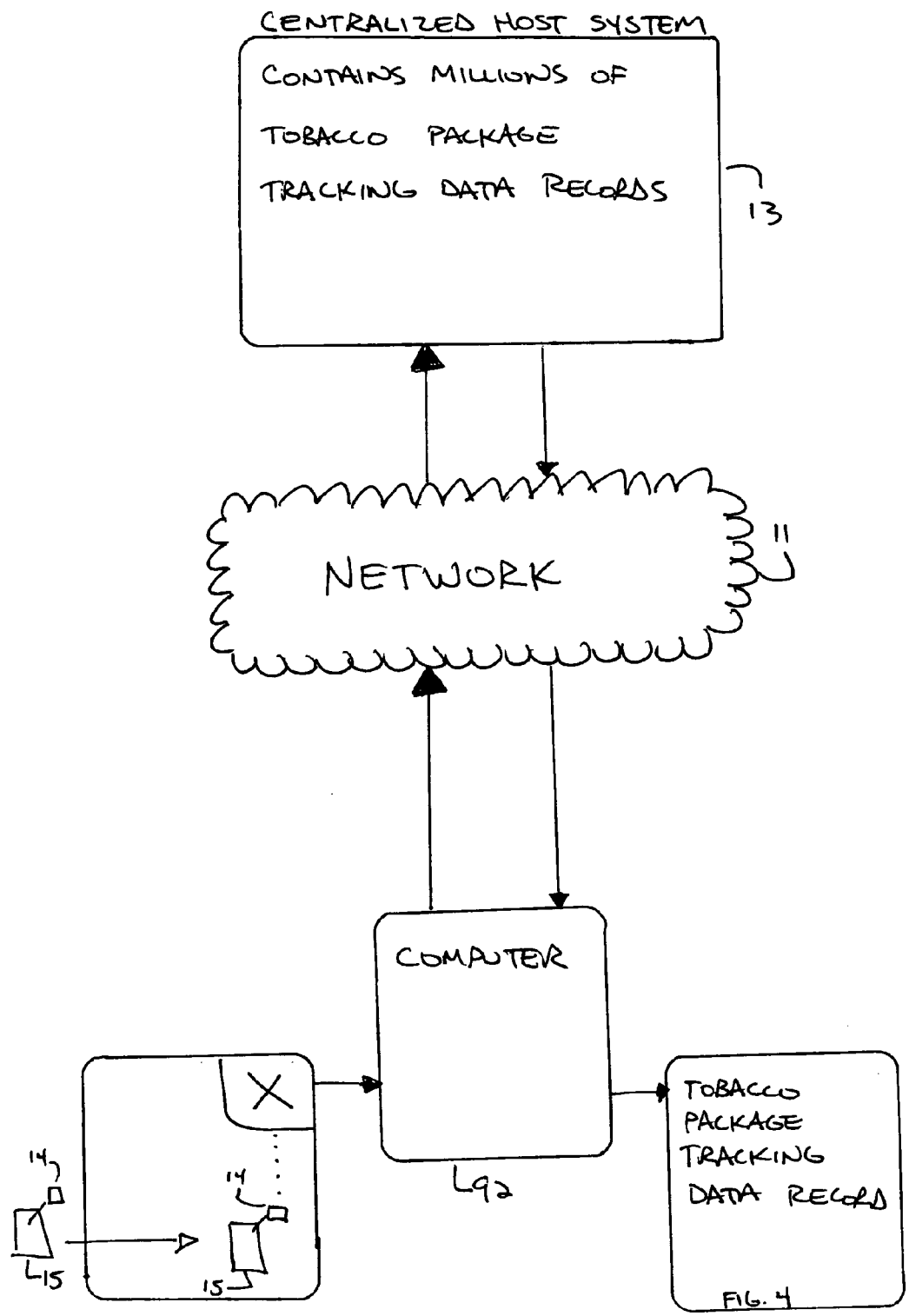
FIG. 5 illustrates a block diagram of one embodiment of a tracking system.

FIG. 5 illustrates a block diagram of one embodiment of a tracking system from the point of storage 13 to a point of detection 91. It is to be understood that some elements of the tracking system may include numerous interconnected computers and components designed to perform a set of specified operations.

In this embodiment, the centralized host system 13 typically will contain numerous tobacco package tracking data records categorized and/or identified by their identity code 14. When a tobacco package is scanned at a point of detection 91, the tobacco package tracking data record (see FIG. 4) can be accessed. The tobacco package tracking data record will indicate the transferee or purchaser of the tobacco package at each point of transfer or purchase, as well as the place, date and time of the transfer or purchase.

Figure 6:
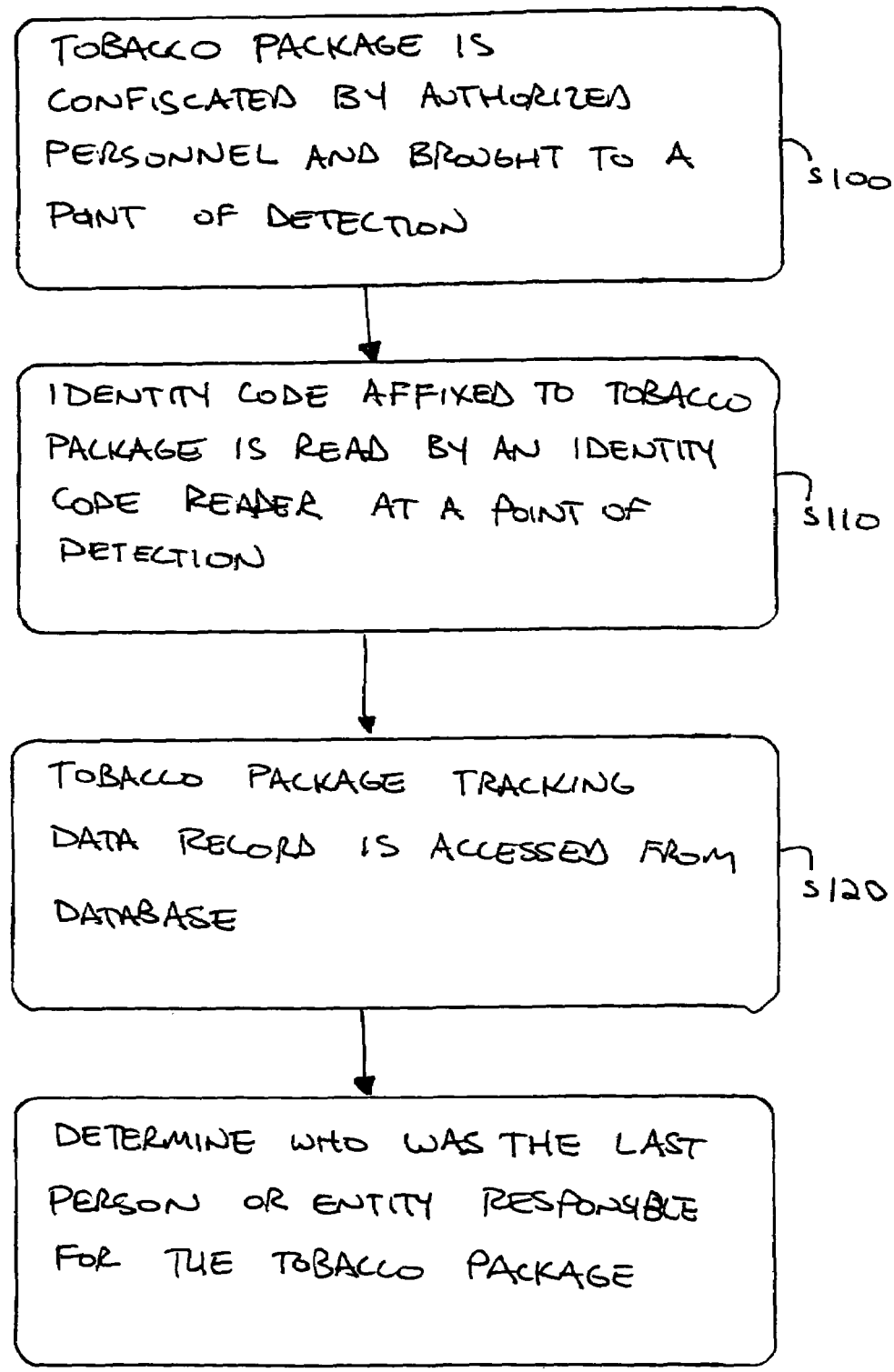
FIG. 6 is a flow chart illustrating one embodiment of a method for retrieving a tobacco package tracking data record.

FIG. 6 is a flow chart illustrating a series of steps that may be performed at a point of detection 91 for retrieving a tobacco package tracking data record. It is to be understood that aspects of this method, in some cases, may be implemented by hardware (e.g., device, computer, computer system, equipment, component), software (e.g., program, application, instructions, code), a storage medium (e.g., disk, external memory, internal memory, propagated signal), or combination thereof.

At a time when the purchaser or transferee of a tobacco package 15 must be determined, the tobacco package 15 is brought to a point of detection 91 by authorized personnel (S100). The identity code 14 affixed to the tobacco package 15 is then read by an identity code reader 16 at the point of detection 91 (S110). Once the tobacco package 15 is read by the identity code reader 16 (S110) the tobacco package data record is accessed from the centralized database 13 by means of a network 11 (S120). Authorized personnel can then determine the last person or entity responsible for the tobacco package, as well as verify the date, time and place the package was purchased (S130).

Aspects of the present invention may be implemented by a computer system and/or by a computer program stored on a computer readable medium. The computer readable medium may be a disk, a device, and/or a propagated signal.

The computer system may include a client system connected through a network to a destination system. The client system may include hardware and/or software components for communicating with the network and destination system. The destination system may include and/or form part of an information delivery network, such as, for example the Internet, the World Wide Web, an online service provider, and/or any other analog or digital wired and/or wireless network that provides information. The client system and destination system each may include one or more devices operating under the command of one or more programs.

Examples of a device include, but are not limited to, a personal computer ("PC"), a workstation, a server, a laptop, a Web-enabled telephone, a Web-enabled personal digital assistant ("PDA"), or any other component, machine, tool, equipment, or some combination thereof capable of responding to and executing instructions.

Examples of a program include, but are not limited to, a software application, a piece of code, an instruction, another device, or some combination thereof, for independently or collectively instructing the device to interact and operate as desired. The program may be embodied permanently or temporarily in any type of machine, component, physical or virtual equipment, storage medium or propagated signal capable of providing instructions to a device. In particular, the program may be stored on a storage media or device readable by a computer, such that if the storage media or device is read by a computer system, the functions described herein are performed.

Examples of a network include, but are not limited to, a local area network ("LAN"), a wide area network ("WAN"), the Internet, the Web, a telephone network, a radio network, a television network, a cable network, a satellite network, and/or any other wired or wireless communications network configured to carry data. The network may include one or more elements, such as, for example, intermediate nodes, proxy servers, routers, switches, adapters, and wired or wireless data pathways, configured to direct and/or deliver data.

What is claimed is:

1. A system for tracking tobacco packages, the system comprising:
    a unique identity code affixed to each package including a tobacco product wherein each unique identity code is a radio frequency tag;
    an identification terminal configured to read identification information embedded within an identification card of each transferee of each tobacco package;
    an identity code reader configured to read the unique identity code affixed to each tobacco package at least at each transfer of the tobacco package;
    a centralized host system configured to store an integrated listing of tobacco product packages and transferees of each package; and
    a communicating device configured to combine the identification information and identity code information and configured to communicate the combined identification information and the identity code information associated with each transfer of at least one tobacco package to the centralized host system for registering the transfer of the at least one tobacco package.

2. The system for tracking tobacco packages of claim 1, wherein the tobacco package includes cigarettes.

3. The system for tracking tobacco packages of claim 1, wherein the tobacco package includes packs of cigarettes.

4. The system for tracking tobacco packages of claim 1, wherein the tobacco package includes smokeless tobacco.

5. The system for tracking tobacco packages of claim 1, wherein the tobacco package includes chewing tobacco.

6. The system for tracking tobacco packages of claim 1, wherein the tobacco package is affixed with the identity code at the point of manufacture.

7. The system for tracking tobacco packages of claim 1, wherein the identification terminal comprises a credit card scanner.

8. The system for tracking tobacco packages of claim 1, wherein the identification terminal comprises a cash register.

9. The system for tracking tobacco packages of claim 1, wherein the identification terminal comprises a scanning device configured to read governmental identification cards.

10. A method of tracking tobacco packages, the method comprising the steps of:
    applying a unique identity code to each tobacco package at a manufacturing plant wherein each unique identity code is a radio frequency tag;
    reading the unique identity code of each tobacco package at least at a point of transfer of the tobacco package;
    reading identification information of the transferee of the tobacco package at the point of transfer of the tobacco package, the identification information being embedded within an identification card of the transferee, and wherein an identification terminal reads identification information about a transferee;
    associating the unique identity code of the tobacco package with the identification information of the transferee of the tobacco package at the point of transfer; communicating the associated tobacco package and transferee information over a network to a centralized host system; and
    storing the associated information in the centralized host system providing an integrated, automated reviewable record of the transferees of the tobacco packages.

11. The method of tracking tobacco packages of claim 10, wherein the identification terminal includes a number identifying the place the tobacco package was purchased into the identification information associated with the unique identity code.

12. The method of tracking tobacco packages of claim 10, wherein the identification information is read from a government-issued identification card of the transferee.

13. The method of tracking tobacco packages of claim 12, wherein the identification information comprises a date of birth of the transferee.

14. The method of tracking tobacco packages of claim 12, wherein the identification card comprises a driver's license.

15. The method of tracking tobacco packages of claim 10, wherein the unique identity code of each tobacco package comprises one or more of: product number, case number, and individual package number.

16. The method of tracking tobacco packages claim 10, wherein the step of communicating comprises transmitting data across the network.

17. The method of tracking tobacco packages of claim 16, wherein the network comprises one or more of: a wireless network, a wide area network, and a local area network.

18. A system for tracking tobacco packages, the system comprising:
    a centralized host system configured to receive associated identification information and identity code information regarding transfers of tobacco packages the identification information being embedded within an identification card of the transferee that is automatically read by an identification terminal and the identity code information being affixed to a tobacco package at a tune of transfer in the form of a unique identity code for each tobacco package, wherein each unique identity code is a radio frequency tag; and
    means for storing the identification information and the identity code information in the centralized host system for registering the transfer of the tobacco package with the transferees of the tobacco package.

* * * * *